(12) United States Patent
Chen et al.

(10) Patent No.: US 7,353,224 B2
(45) Date of Patent: Apr. 1, 2008

(54) SYSTEM AND METHOD FOR EFFICIENTLY FINDING NEAR-SIMILAR IMAGES IN MASSIVE DATABASES

(75) Inventors: Trista P. Chen, Pittsburgh, PA (US); Thiruvadaimaruthur M. Murali, Blacksburg, VA (US); Rahul Sukthankar, Somerville, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 10/005,193

(22) Filed: Dec. 4, 2001

(65) Prior Publication Data

US 2003/0110163 A1     Jun. 12, 2003

(51) Int. Cl.
*G06F 17/30*     (2006.01)
(52) U.S. Cl. .............................. 707/6; 707/5; 707/102; 707/103 R; 707/104.1
(58) Field of Classification Search ................ 382/145, 382/198, 209; 707/2, 3, 5, 6, 10, 100, 102, 707/103 R, 104.1, 1, 101; 703/27; 706/23; 709/203, 223; 713/176
See application file for complete search history.

(56) References Cited

U.S. PATENT DOCUMENTS

| | | | |
|---|---|---|---|
| 6,049,797 A * | 4/2000 | Guha et al. ................ 707/6 |
| 6,598,054 B2 * | 7/2003 | Schuetze et al. ........ 707/103 R |
| 6,751,343 B1 * | 6/2004 | Ferrell et al. ............... 382/145 |
| 6,754,667 B2 * | 6/2004 | Kim et al. .................. 707/102 |

OTHER PUBLICATIONS

Derrode et al, Invariant content-based image retrieval using a complete set of Fourier Mellin descriptors, Jul. 1999, IEEE, pp. 877-881.*
Gotze et al, Invariant object recognition with discriminant features based on local Fast-Fourier Mellin Transform, Sep. 3-7, 2000, IEEE, pp. 948-951.*

(Continued)

*Primary Examiner*—John Breene
*Assistant Examiner*—Fred I Ehichioya

(57) ABSTRACT

Massive amounts of multimedia data are stored in databases supporting web pages and servers, including text, graphics, video and audio. Searching and finding matching multimedia images can be time and computationally intensive. A method for storing and retrieving image data includes computing a descriptor, such an a Fourier-Mellin Transform (FMT), corresponding to a multidimensional space indicative of each of the stored images and organizing each of the descriptors according to a set similarity metric. The set similarity metric is based on Locality-Sensitive Hashing (LSH), and orders descriptors near to other descriptors in the database. The set similarity metric employs set theory which allows distance between descriptors to be computed consistent with LSH. A target image for which a match is sought is then received, and a descriptor indicative of the target image is computed. The database is referenced, or mapped, to determine close matches in the database. Mapping includes selecting a candidate match descriptor from among the descriptors in the database and employing a distance metric derived from the similarity metric to determine if the candidate match descriptor is a match to the target descriptor.

20 Claims, 4 Drawing Sheets

OTHER PUBLICATIONS

Syracuse Univewrsity, A study of the overlap among document representations, 1983 ACM, pp. 106-114.*

Indyk, P., and Motwani, R., "Approximate Nearest Neighbors: Towards Removing the Curse of Dimensionality (preliminary version)," pp. 1-13 and i-vii, *Proceedings of 30th Symposium on Theory of Computing*, (Dec. 30, 1999).

Gionis, A., et al., "Similarity Search in High Dimensions via Hashing," Proceedings of the 25th VLDB (Very Large Database) Conference, Edinburgh, Scotland, (1999).

Broder, A.Z., "On the resemblance and containment of documents," *IEEE Computer Society*, pp. 21-29, (1998).

Bracewell, R., "Relatives of the Fourier transform," *The Fourier Transform and Its Applications, McGraw-Hill*, New York, NY, pp. 241-274 (1978).

* cited by examiner

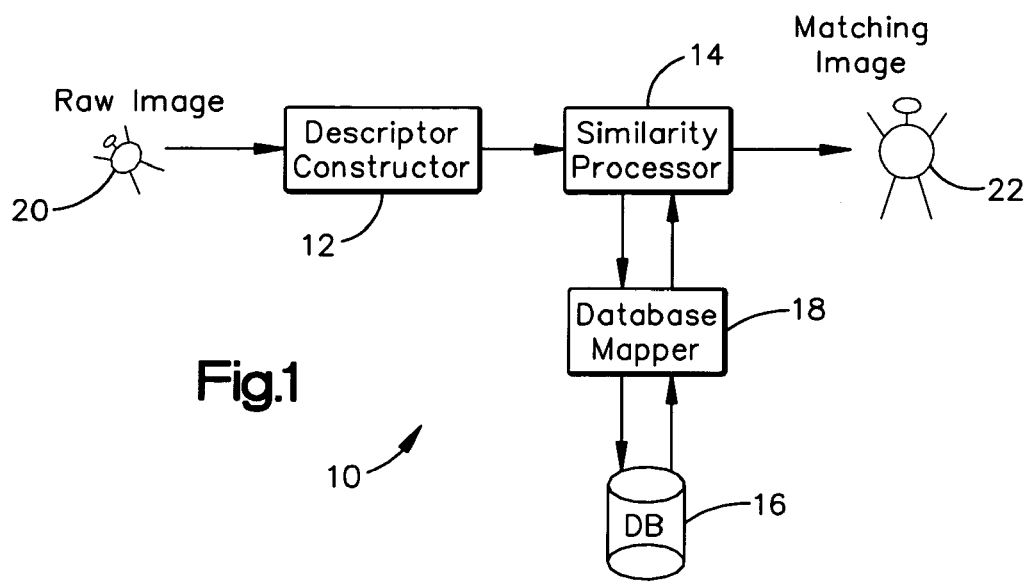
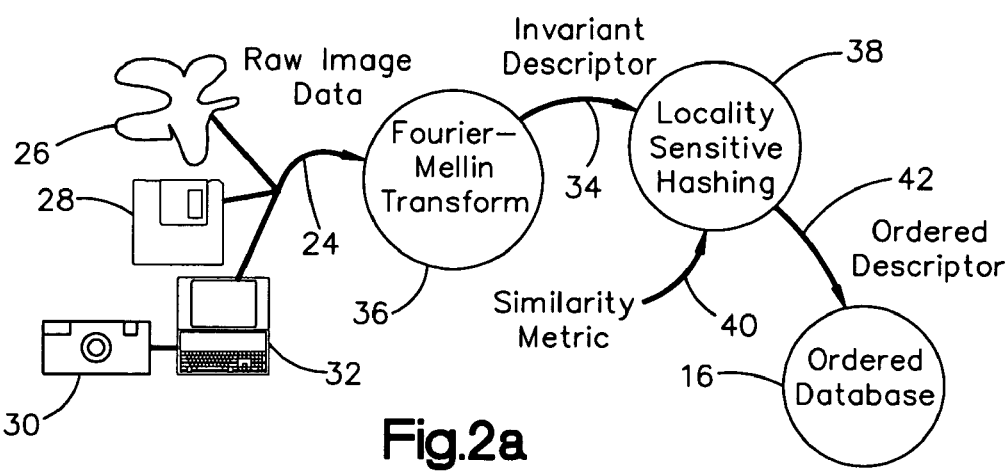
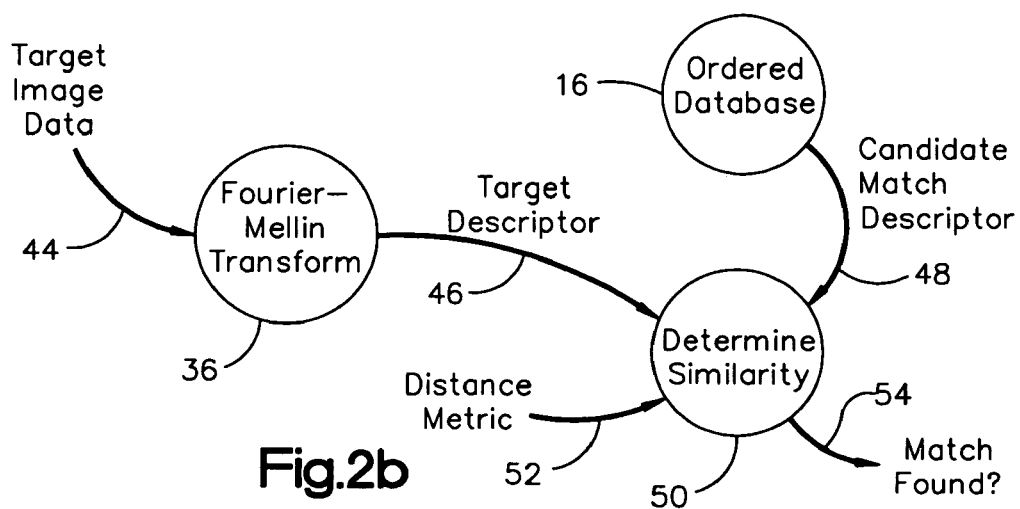

SYSTEM AND METHOD FOR EFFICIENTLY FINDING NEAR-SIMILAR IMAGES IN MASSIVE DATABASES

BACKGROUND OF THE INVENTION

Multimedia database image retrieval techniques are known which attempt to find and retrieve a matching image or matching images from a database of stored multimedia images. Such retrieval techniques are becoming commonplace with the proliferation of information disseminated and available over computer networks such as the Internet. Massive amounts of multimedia data are stored in databases supporting web pages and servers, including text, graphics, video and audio. Searching and finding matching multimedia images can be time and computationally intensive.

Queries employed to find matching images typically compute statistics for the image and compare the statistics to a database of statistics from potential matches. Alternatively, the image is subdivided into regions and statistics computed for each region. The statistics are combined into a vector quantity in a high-dimensional space, and comparison between two images involves computing, for example, the Euclidean distance between the vectors to determine similarity. Vectors which are "near" to each other correspond to images which are similar.

In the case of images, however, typical prior art techniques tend to check every image in the database for similarity, a process which is very slow for large data sets. Indexing techniques such as a K-d tree may be used to augment the search, but frequently fail to effectively restrict the search to a small portion of the database, resulting in an exhaustive "brute force" search methodology, particularly with multidimensional spaces greater than 20 dimensions.

The dimensionality performance issue has been addressed by Locality-Sensitive Hashing ("Approximate Nearest Neighbors: Towards Removing the Curse of Dimensionality," in Proc. $30^{th}$ Symposium on Theory of Computing (1998)). Standard similarity metrics, however, such as Euclidean and Manhattan distance-based algorithms, cannot take full advantage of advantages of multidimensional near-neighbor searching provided by Locality-Sensitive Hashing (LSH) because they do not satisfy certain properties exploited by LSH.

Further, comparison techniques used for images tend to be sensitive to common transformations. Such comparison techniques may not be robust enough to detect a match between two images that differ by a subtle geometric transformation, such as rotation, translation, or scaling.

Accordingly, it would be beneficial to develop an efficient method for finding near-similar images which avoids an exhaustive search of all candidate data and which is resilient to minor geometric transformations of similar images.

SUMMARY OF THE INVENTION

A method for storing and retrieving image data from a database having a plurality of potential match images includes (i) computing a match descriptor corresponding to a multidimensional space indicative of each of the stored images, and (ii) organizing each of the match descriptors according to a similarity metric. The similarity metric is employed to order match descriptors near to other match descriptors in the multidimensional space. A target image for which a match is sought is then received, and a target descriptor indicative of the target image is computed. The database is referenced, or mapped, to determine a close match to the target descriptor among the match descriptors in the database, a close match being determined by a distance to a near match descriptor being within a predetermined threshold. The database mapping includes selecting a nearest-neighbor candidate match descriptor from among the match descriptors in the database and employing a distance metric derived from the similarity metric to determine if the candidate match descriptor is a match to the target descriptor.

The match descriptors are invariant descriptors derived either from a Fourier-Mellin Transform (FMT) or color histogram, for example, which are generally insensitive to geometric transformations such as translation, scaling, rotation, or common image processing such as compression, filtering. Such descriptors capture information about the images in the form of a set such that a set similarity metric, described farther below, may be applied to determine similarity or dissimilarity between images.

The match descriptors denote a vector quantity in a multidimensional space and are stored in the database accordingly. Locality-Sensitive Hashing (LSH) is employed to organize, or order, the descriptors in the database in a nearest-neighbor manner such that the descriptors corresponding to similar images are stored near each other in the database. By storing the descriptors near descriptors corresponding to similar images, existing matches are selected by the hashing, rather than requiring a brute-force search of all descriptors in the database. Therefore, LSH ordering allows a measure of similarity for matching to be applied by examining only a fraction of the database. A distance metric derived from the similarity metric indicates descriptors which are near matches to other descriptors in the multidimensional space. Candidate match descriptors which are near the match descriptor are selected as the matching image or set of images responsive to a query. In alternate embodiments, additional searching from among near descriptors could also occur, followed by attempts to match against more distant descriptors.

In this manner, target images which have been subjected to geometric transformations may still be found because the invariant descriptors are insensitive to such transformations, and the search required need traverse only a subset of the database because the descriptors are stored near other, similar descriptors via LSH which provides that candidate match descriptors more likely to produce a valid match are tried before other less likely match candidates.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a block diagram of the invention system as defined herein;

FIGS. 2a and 2b are data flow diagrams of the population and retrieval phases, respectively, of the present invention as defined herein;

DETAILED DESCRIPTION OF THE INVENTION

Figure 3:
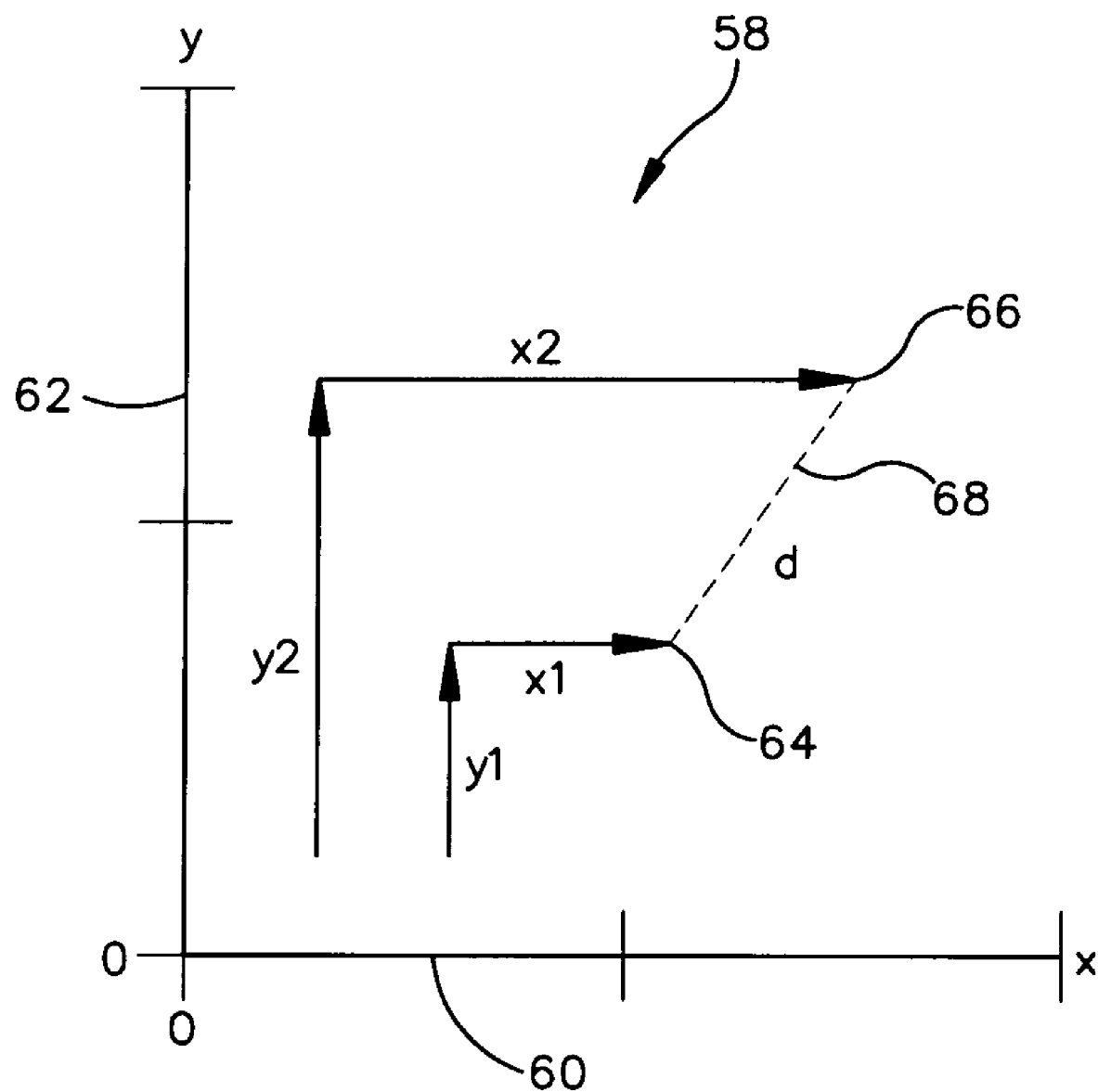
FIG. 3 illustrates Euclidean distance in a multidimensional space.

A description of preferred embodiments of the invention follows.

The image storage and retrieval system of the present invention system employs two phases. A population phase stores image data in a database according to a similarity metric. The similarity metric ensures that similar images are stored near other similar images in the multidimensional space defined by the database. Storing images near other images limits search traversals to a fraction of the database because the image sought is organized near similar images. A retrieval phase traverses the database and compares a target image to the stored images. The images are compared according to a similarity metric, which defines distance in the multidimensional space. Images which are sufficiently near the target images are deemed to be a match. By organizing the database according to the similarity metric, the search commences on images near the matching image, and successive match attempts will occur on near images such that only a fraction of the database need be mapped to find a matching image.

FIG. 1 shows a block diagram of the system as defined herein. Referring to FIG. 1, the image storage and retrieval system 10 includes a descriptor constructor 12, a similarity processor 14, a database 16, and a database mapper 18. The descriptor constructor 12 is employed to compute an invariant descriptor corresponding to a raw target image 20 for which a match is sought.

The database mapper 18 finds a candidate match descriptor in the database 16 from among vectors which are near the raw target image 20 descriptor for which a match is sought, described further below. The similarity processor 14 compares the two descriptors (the raw target image 20 descriptor and the candidate match descriptor from database 16) according to a similarity metric to determine if there is a match. If the similarity processor 14 determines that the two vectors are sufficiently similar, the matching image or images 22 corresponding to the candidate match descriptor is returned. The matching image or images may have been transformed, such as scaled or rotated, as shown by the target image 20 and matching image 22 in FIG. 1. In a particular embodiment, the locality-sensitive hashing employed in organizing the database 16 results in a nearest-first mapping that returns pertinent image or images. In the event that the mapping does not yield a workable set of images, additional candidate match descriptors may be selected by the database mapper 18 from among descriptors near the previous candidate match descriptors in the database 16 and the foregoing similarity measure by similarity processor 14 may be repeated.

FIG. 2a shows a dataflow of the population phase. Referring to FIG. 2a, raw image data is gathered for inclusion in the database 16, as shown by arrow 24. The raw image data may be gathered from a variety of sources, such as the Internet 26, magnetic media 28, digital camera 30 via PC 32, or other sources. The raw image data 24 is used to derive an invariant descriptor 34 corresponding to the raw image 24. The invariant descriptor 34 is a vector form of the data, such as statistics, in a multidimensional space.

The invariant descriptor 34 may be computed by a Fourier-Mellin Transform (FMT) 36, color histogram, or other method, and defines the image data 24 in terms of attributes. The attributes may be expressed as inclusion or exclusion from a set, and therefore may be expressed in a boolean form which may be compared according to a set similarity metric, described further below. The use of an FMT has been employed with text, as described in Bracewell, "The Fourier Transform and its Applications," McGraw-Hill, New York (1978). The result of the FMT can be further processed using vector quantization, described further below, which produces output that is symbolic and is amenable to a set similarity metric. The invariant descriptor 34 defines the image data 24 in terms which are resistant to typical geometric transformations such as rotation, translation, scaling, cropping, or image processing operations such as compression and filtering. In this manner, the invariant descriptor form may be used to compare images and detect matches of images which differ merely in size, orientation, scaling or omission.

The invariant descriptor 34 is then organized in the database 16 according to LSH 38 using a similarity metric 40. The similarity metric 40 is preferably a set similarity metric which orders the invariant descriptor 34 near other invariant descriptors already in the database 16. The LSH 38 determined order is used to provide an ordered descriptor 42 to the database 16. Image data 24 is stored and organized in the database 16, thereby producing a database 16 of image data descriptors organized in a multidimensional space in which descriptors corresponding to similar images are organized near each other in the multidimensional space.

FIG. 2b shows a data flow of the retrieval phase. Referring to FIG. 2b, target image data 44 for which a match is sought is provided. The target image data 44 undergoes a FMT 36 to compute a target invariant descriptor 46 to compare against database entries. The target invariant descriptor 46 is preferably a vector quantity of the same dimensionality as the descriptors already stored in the database 16. A candidate match descriptor 48 is provided from the database 16 from descriptors that are near to the target descriptor 46. A similarity metric employed in ordering the descriptors in the database 16 is employed to derive a distance metric 52, which is used to determine the distance, or similarity 50 between the target descriptor 46 and the candidate match descriptor 48. Similarity is determined by computing a distance, based on the distance metric 52, between the target candidate and match descriptors 46, 48 in the multidimensional space defined by the database 16. If the vectors of descriptors 46, 48 are similar, as indicated by a small distance, than the respective candidate match descriptor 48 is returned as the match result 54, or a result of no match is the descriptors 46, 48 are not similar. Alternatively, if the distance metric 52 does not indicate a match between the descriptors 46, 48, then another candidate match descriptor 48 may selected from the near match descriptors in the database 16.

FIG. 3 illustrates the notion of distance between vectors in a multidimensional space according to a prior art Euclidean metric. The distance between vectors indicates the degree to which one vector is to another. In the example shown, a two dimensional vector space, often referred to as a Cartesian plane, is shown as illustrative, however, the invariant descriptors as described herein employ many more dimensions depending on the number of statistics employed by the similarity metric. Referring to FIG. 3, the two dimensional space 58 has an x axis 60 and a y axis 62. A first vector is defined by x1, y1, and is shown as a point 64. A second vector, defined by x2, y2 is shown as a point 66. The distance d between the two points is shown by dotted line 68, and indicates the degree of similarity between the two vectors. As the number of dimensions included in a vector increase, graphical representation becomes infeasible, however, the notion of distance employed herein as defined by the similarity metric remains.

Note that the set similarity metric, as employed herein, differs from the trigonometric representation of vector distance as shown in FIG. 3 in that the vectors are defined in terms of a set. A set defines elements in terms of a boolean relationship of inclusion or exclusion from the set. The LSH method employed to organize the invention database 16 uses a set similarity metric, described further below. Further, the similarity metric defines the distance metric used to determine descriptors, or vectors, which are organized near other vectors in the database 16.

Figure 4:
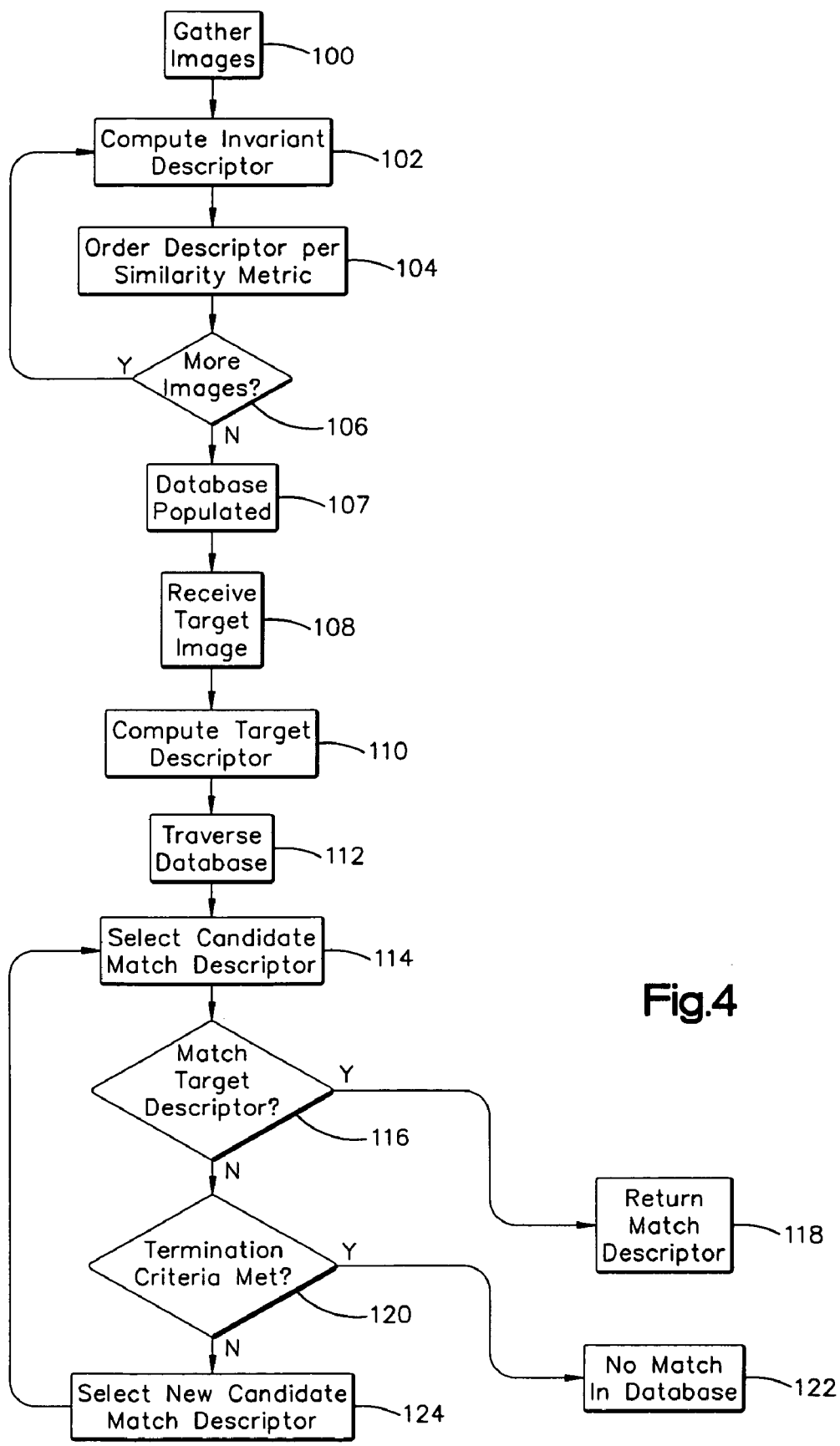
FIG. 4 shows a flowchart of the invention system as defined herein.

FIG. 4 shows a flowchart of descriptor ordering and database mapping in the preferred embodiment. Referring to FIGS. 4, 2a, and 2b, raw data images 24 are gathered for population of the database 16, as shown at step 100. A transformation-invariant descriptor 34 is computed for each image 24, as depicted at step 102. The transformation-invariant descriptor 34 is organized according to the similarity metric and stored in the database 16, as disclosed at step 104. A check is made to determine if any more images 24 remain for organizing in the database 16, as shown at step 106. If there are more images 24 for organizing in the database, processing control reverts to step 102. Otherwise, the database 16 is populated with ordered invariant descriptors 42, or match descriptors, as shown at step 107.

A target image 44 is received for matching against images (represented by ordered descriptors 42) in the database 16, as depicted at step 108. An invariant descriptor corresponding to the target image 44, or target descriptor 46, is computed, as depicted at step 110. The target descriptor 46 is then employed to map into the database 16, as disclosed at step 112, and select a candidate match descriptor 48 from match descriptors that are near the target descriptor 46, as shown at step 114. A check is performed employing the distance metric 52 to determine if the selected candidate match descriptor 48 is a match to the target descriptor 46, as depicted at step 116. A match occurs if the distance metric 52 indicates that the two invariant descriptors 46, 48 are sufficiently near, or within a distance threshold, to be considered a match. The match descriptor 48 is returned if a match was found, as shown at step 118.

Otherwise, a check is performed to determine if a search termination criteria, indicative of a failure to find a match, is performed, as shown at step 120. The search termination criteria may be a number of successive candidate match descriptors 48 having been compared, a candidate match descriptor beyond a certain distance, or a combination of a maximum distance and number of iterations. If the search termination criteria has been met, then no match exists in the database 16, and the search is concluded at step 122. Otherwise, a new candidate match descriptor 48 is selected from among the near match descriptors, as shown at step 124, and control reverts to step 114.

The set similarity metric 40 defines similarity between descriptors which define data images in terms of inclusion or exclusion of attributes. An associated distance metric 52 quantifies the distance, or degree of similarity, between such descriptors. The LSH 38 population of the database 16 employs such a set similarity metric. In a particular embodiment, images are subdivided into overlapping regions at various scales and positions, described further below. For each region, certain statistics are computed which are robust to image transformations, such as an FMT or a color histogram of the region. Each region of the image, therefore, is represented as a transformation-invariant descriptor of the image data.

The set similarity metric is applied to order the database 16 and to determine the difference D between two images. One such metric is a set intersection similarity metric, as follows. Given two descriptors A and B, the set similarity measure between A and B is the ratio of the number of elements common to the two sets and the total number of unique elements in the two sets:

$$D(A, B) = \frac{|A \cap B|}{|A \cup B|} \qquad \text{Eq. 1}$$

Following is an example of the set intersection similarity metric applied to determine the distance between sets. Given two sets of image data, A and B, invariant descriptors are computed and compared to determine the distance.

The image data is as follows:
Data A="hello there"
Data B="hi there"

The invariant descriptor is defined to be the presence of a particular character. Applying to the example image data results in the following invariant descriptors:
A={h, e, l, o, t, r}
B={h, i, t, h, e, r}

Applying our similarity metric to determine the distance yields four elements common to both and seven total unique elements:

$$\frac{|A \cap B|}{|A \cup B|} = \frac{\{h, e, t, r\}}{\{h, e, l, o, t, r, i\}} = \frac{4}{7} = 0.57$$

It follows logically that the set similarity metric defines a value near 1 as a near match, and a value near 0 as a distant match.

The set similarity metric and the resulting distance metric comparison is applied to visual image data by defining a set of statistics which define an image in terms of boolean relationships. The above example employs the presence or absence of a letter as a boolean attribute of the sets. Other attributes may be employed. Further, the image partitioning employed breaks an image up into regions, each of which exhibits set attributes, illustrated further below.

The statistics are gathered from the data using image processing techniques such as an FMT, color histogram, or other method operable to define an image or region of an image in terms of an invariant descriptor. Both the FMT and color histograms have the valuable property of resilience to geometric transformations. The color histogram is a typical representation employed in image processing which may be adapted to a set similarity metric as defined herein. A typical color histogram may have 256 bins, which will usually be too fine a granularity with which to define equality and inequality of vectors in a boolean manner applicable to sets. However, vector quantization can be employed to cluster vectors and consider them to be equal if they are in the same cluster.

Figure 5:
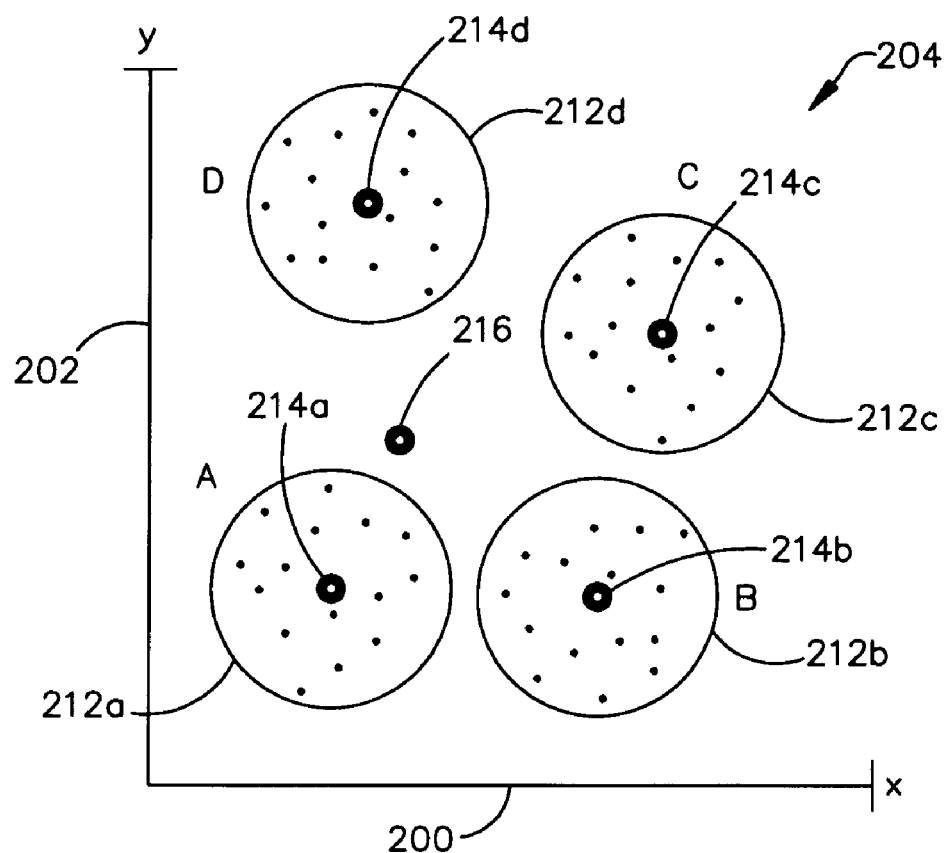
FIG. 5 is a graphical illustration of vector quantization as defined herein.

FIG. 5 shows an example of vector quantization. Vector quantization allows representation of numeric information, such as that contained within an invariant descriptor, in a symbolic way. Both FMTs and color histograms produce numeric output which is transformed to a symbolic representation, such as by vector quantization, for use with LSH. Referring to FIG. 5, a two dimensional space is shown. In the actual implementation, more dimensions would be employed. A typical color histogram may employ 64 dimensions, for example, however the two dimensions shown are intended as illustrative. An x axis 200 and a y axis 202 define a multidimensional space 204. A collection of four vectors are illustrated, and shown by clusters of points defined by circles 212a–212d. In the example given above, the alphanumeric characters embodied in the invariant descriptors could be granularized to form groups of related vectors. Each cluster of points, for example the cluster 212a, defines a vector near the vector defining an ideal A, shown by point 214a. Each of the other clusters 212b–212d is likewise defined around an ideal vector 214b–214d, respectively. Vector 216, being near to the ideal A vector 214a, would be considered part of the cluster 212a. Inclusion or exclusion of vectors in certain groups may be tuned to give relative weights to attributes, for example the lines 212a–212d defining quantized groups need not necessarily define circular boundaries.

Figure 6:
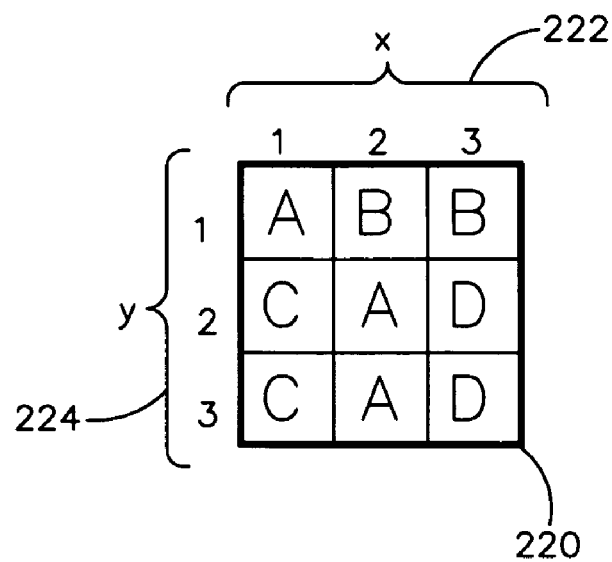
FIG. 6 shows image partitioning for a set similarity metric of the preferred embodiment.

As indicated above, image partitioning is employed to subdivide an image into regions of salient features. FIG. 6 shows an example of image partitioning as employed to define the invariant descriptors. Since the invariant descriptors employed by the set similarity metric exhibit boolean characteristics, the image partitioning denotes regions having the presence or absence of a particular attribute. Referring to FIG. 6, an image 220 is subdivided into a 3 by 3 grid of regions, denoted by x axis 222 and y axis 224. Each of the nine regions (x,y) has the indicated attribute A, B, C or D, and thus the absence of the remaining attributes A–D. Therefore, invariant descriptors defining each of the regions are as follows in Table I wherein absence of an attribute is designated with an overhead bar notation:

TABLE I

| (x, y): | {Descriptor} |
|---|---|
| (1, 1): | {A, $\bar{B}$, $\bar{C}$, $\bar{D}$} |
| (1, 2): | {$\bar{A}$, $\bar{B}$, C, $\bar{D}$} |
| (1, 3): | {$\bar{A}$, $\bar{B}$, C, $\bar{D}$} |
| (2, 1): | {$\bar{A}$, B, $\bar{C}$, $\bar{D}$} |
| (2, 2): | {A, $\bar{B}$, $\bar{C}$, $\bar{D}$} |
| (2, 3): | {$\bar{A}$, B, $\bar{C}$, $\bar{D}$} |
| (3, 1): | {$\bar{A}$, B, $\bar{C}$, $\bar{D}$} |
| (3, 2): | {$\bar{A}$, $\bar{B}$, $\bar{C}$, D} |
| (3, 3): | {$\bar{A}$, $\bar{B}$, $\bar{C}$, D} |

Alternatively, a partitioning scheme may focus on certain salient features in the image, since certain regions may contain more useful information than others. Interesting local features are considered, such as corners and highly-textured patches and scaled appropriately to distinguish the content, while static regions of little variance might be considered more broadly.

Representing image descriptors with vectors formed of the foregoing set elements is key to the preferred embodiment. Such set descriptors are employed at 34, 42 in FIG. 2a in populating the database 16 and at 46, 48 in FIG. 2b in finding matches from database 16. The set similarity between descriptors 46, 48 is then measured, (calculated) by Eq. 1 as the similarity distances at 52 in FIG. 2b. Such use of set theory in combination with FMT, vector quantization and LSH techniques in determining near similar images in a database allows the present invention to be efficient and advantageous over the prior art.

Those skilled in the art should readily appreciate that the programs for storing and retrieving image data as defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims. Accordingly, the invention is not intended to be limited except as defined by the following claims.

What is claimed is:

1. A method of storing and ordering image data in a database comprising:

gathering a plurality of images for inclusion in the database;

computing, by a Fourier-Mellin Transform (FMT), a match descriptor indicative of each of the plurality of images, each of the match descriptors corresponding to a multidimensional space having more than two dimensions;

organizing the match descriptors in the database, the organizing being performed according to a predetermined metric indicative of a correspondence between a given match descriptor and the other match descriptors in the database, wherein the predetermined metric defines a similarity between two different match descriptors such that the similarity is a ratio of a number of elements common to two sets of match descriptors and a total number of unique elements in the two sets of match descriptors;

receiving a target image for which a match is sought;

computing a target descriptor indicative of the target image;

mapping into the database to determine a close match of the target descriptor among the organized match descriptors;

selecting a candidate match descriptor from among the organized match descriptors; and returning the candidate match descriptor if the candidate match descriptor is a match to the target descriptor, the match being determined by a similarity metric, wherein the predetermined similarity metric defines a ratio of (i) a number of descriptors common to the target and candidate match descriptors and (ii) a total number of descriptors unique to the target and candidate match descriptors.

2. The method of claim 1 wherein a match descriptor is a vector quantity.

3. The method of claim 1 wherein the predetermined metric is a distance metric.

4. The method of claim 3 wherein the distance metric is derived from a similarity metric, the similarity metric operable to determine match descriptors near to other match descriptors based on a distance in the multidimensional space.

5. The method of claim 1 further comprising vector quantization of the FMT.

6. The method of claim 1 wherein the match descriptors are invariant descriptors.

7. The method of claim 6 wherein the invariant descriptors are insensitive to geometric translations.

8. The method of claim 1 wherein the organizing according to a predetermined metric father comprises Locality-Sensitive Hashing (LSH).

9. The method of claim 1 wherein the predetermined metric is a distance metric that is derived from a similarity metric, the similarity metric defines a similarity between match descriptors that define images in terms of exclusion of attributes.

10. The method of claim 1 wherein given two different descriptors A and B with a distance D between two images, similarity between A and B is a set intersection metric of $D(A,B)=|A \cap B| \div |A \cup B|$.

11. A method for storing and retrieving image data comprising:
providing a plurality of match images;
computing, by a Fourier-Mellin Transform (FMT), a match descriptor corresponding to a multidimensional space indicative of each of the match images;
organizing each of the match descriptors in a database according to a predetermined similarity metric, the similarity metric operable to indicate match descriptors that are near to other match descriptors In the multidimensional space;
receiving a target image for which a match is sought;
computing a target descriptor indicative of the target image;
mapping into the database to determine a close match of the target descriptor among the organized match descriptors, a close match determined by a distance to a near match descriptor within a predetermined threshold, the mapping further comprising:
selecting a candidate match descriptor from among the organized match descriptors; and
returning the candidate match descriptor if the candidate match descriptor is a match to the target descriptor, the match being determined by a similarity metric, wherein the predetermined similarity metric defines a ratio of (i) a number of descriptors common to the target and candidate match descriptors and (ii) a total number of descriptors unique to the target and candidate match descriptors.

12. The method of claim 11 further comprising selecting another candidate match descriptor if the candidate match descriptor is not a match to the target descriptor, the selecting occurring from among match descriptors organized near the candidate match descriptors.

13. The method of claim 11 wherein near match descriptors are similar vectors in the multidimensional space.

14. The method of claim 11 wherein the similarity metric is a set similarity metric.

15. The method of claim 11 wherein the multidimensional space has more than two dimensions.

16. The method of claim 11 wherein the similarity metric defines a similarity between match descriptors and the target descriptor that defines images in terms of exclusion of attributes.

17. The method of claim 11 wherein given two different descriptors A and B with a distance D between two images, similarity between A and B is a set intersection metric of $D(A,B)=|A \cap B| \div |A \cup B|$.

18. A method of software execution for storing and ordering image data, comprising:
dividing each image of plural images into plural regions;
computing, by a Fourier-Mellin Transform (FMT) for each region, a descriptor that correspond to multidimensional space having more than two dimensions;
organizing the descriptors in the database by applying a similarity metric to measure a difference between two images, wherein the difference between two different sets of descriptors is a ratio of a number of elements common to the two sets and a total number of unique elements in the two sets;
receiving a target image for which a match is sought;
computing a target descriptor indicative of the target image;
mapping into the database to determine a close match of the target descriptor among the organized descriptors;
selecting a candidate match descriptor from among the organized descriptors; and
returning the candidate match descriptor if the candidate match descriptor is a match to the target descriptor, the match being determined by a similarity metric, wherein the predetermined similarity metric defines a ratio of (i) a number of descriptors common to the target and candidate match descriptors and (ii) a total number of descriptors unique to the target and candidate match descriptors.

19. The method of claim 18 further comprising:
computing, by the FMT the target descriptor for the target image;
using the similarity metric to determine similarity between the target descriptor and at least one candidate descriptor from the descriptors.

20. The method of claim 18 wherein given two different descriptors A and B with a distance D between two images, similarity between A and B is a set intersection metric of $D(A,B)=|A \cap B| \div |A \cup B|$.

* * * * *

UNITED STATES PATENT AND TRADEMARK OFFICE
CERTIFICATE OF CORRECTION

| | | |
|---|---|---|
| PATENT NO. | : 7,353,224 B2 | Page 1 of 1 |
| APPLICATION NO. | : 10/005193 | |
| DATED | : April 1, 2008 | |
| INVENTOR(S) | : Trista P. Chen et al. | |

It is certified that error appears in the above-identified patent and that said Letters Patent is hereby corrected as shown below:

In column 9, line 17, in Claim 8, delete "father" and insert -- further --, therefor.

In column 9, line 37, in Claim 11, delete "In" and insert -- in --, therefor.

In column 10, line 48, in Claim 19, after "FMT" insert -- , --.

Signed and Sealed this

Fourteenth Day of July, 2009

JOHN DOLL
*Acting Director of the United States Patent and Trademark Office*